May 13, 1930.   F. M. BOSWORTH   1,758,027
BRAKE CONTROL
Filed June 8, 1928   2 Sheets-Sheet 1

May 13, 1930.  F. M. BOSWORTH  1,758,027
BRAKE CONTROL
Filed June 8, 1928  2 Sheets-Sheet 2
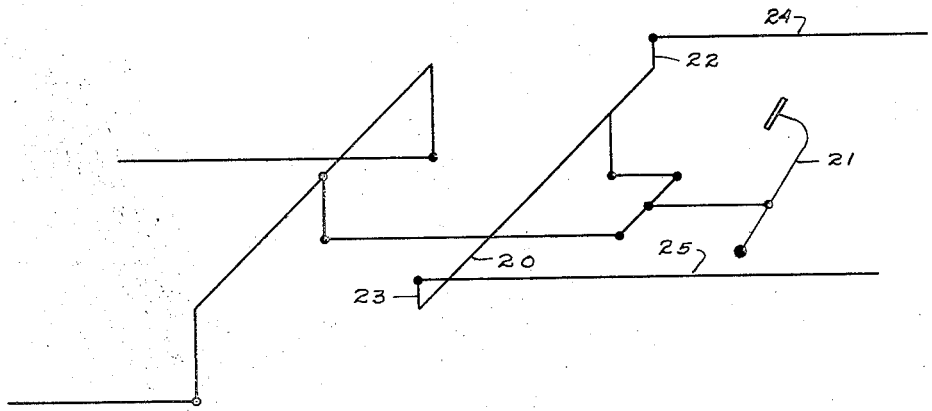
Fig.-4
Fig.-5
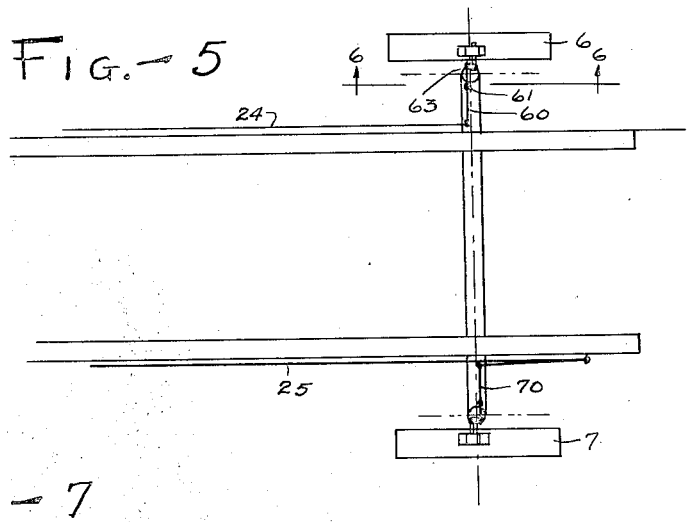
Fig.-7
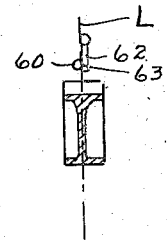
Fig.-6
Frederick M. Bosworth Inventor
By *[signature]*
Attorneys Patented May 13, 1930

1,758,027

UNITED STATES PATENT OFFICE

FREDERIC M. BOSWORTH, OF LAKEWOOD, OHIO, ASSIGNOR TO THE MIDLAND STEEL PRODUCTS COMPANY, OF CLEVELAND, OHIO, A CORPORATION OF OHIO

BRAKE CONTROL

Application filed June 8, 1928. Serial No. 283,784.

This invention relates to vehicle brakes and particularly to an arrangement of brake controls for swiveling wheels.

It is among the objects of my invention to arrange a brake control using flexible conduits with cables housed therein; such for instance, as are illustrated in the well known patent to Bowden No. 609,570, so that equal braking effects may be had by the right and left wheels regardless of the swiveling of those wheels. It is well known that the Bowden conduits tend to creep upon the wire or cable housed therein as the curvature of the conduit is increased and that the frictional resistance may vary with the curvature. When such conduits are employed between the brake linkage and the swiveling wheels of a motor vehicle, there is a tendency for the braking pressure to be increased on one of the wheels and decreased on the other as the wheels are turned.

The precepts of my invention, however, are broader than the use of flexible conduits as part of the control and it is the principal object of my invention to arrange the connections to the right and left swiveling wheels in a complementary manner so that regardless of the swiveling of the wheels and the change of relation between the connections and the swiveling parts that the braking effort on one swiveling wheel equals that on the other when the wheels are turned.

Other objects will appear from the following description of the apparatus constituting my invention, of which a preferred form is illustrated in the accompanying drawings. The essential characteristics are summarized in the claims.

Figure 1:
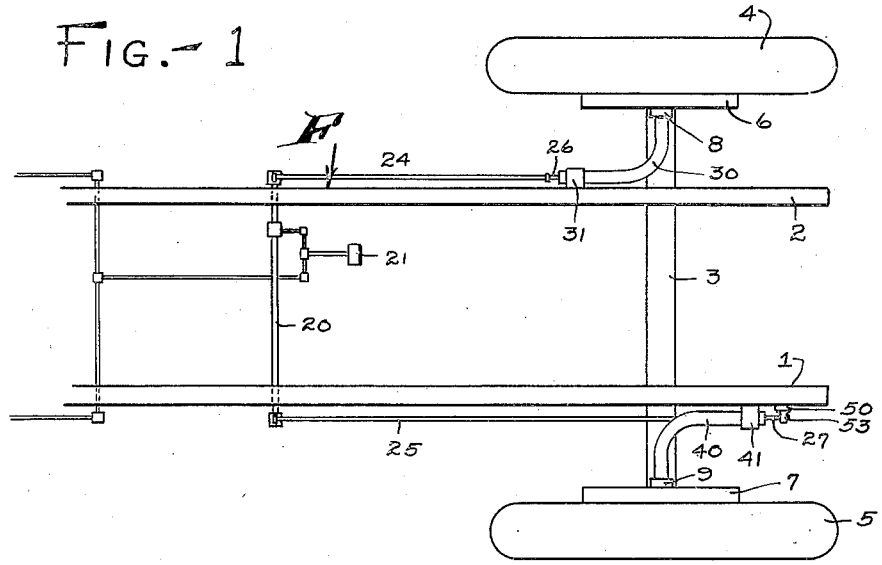
Figure 2:
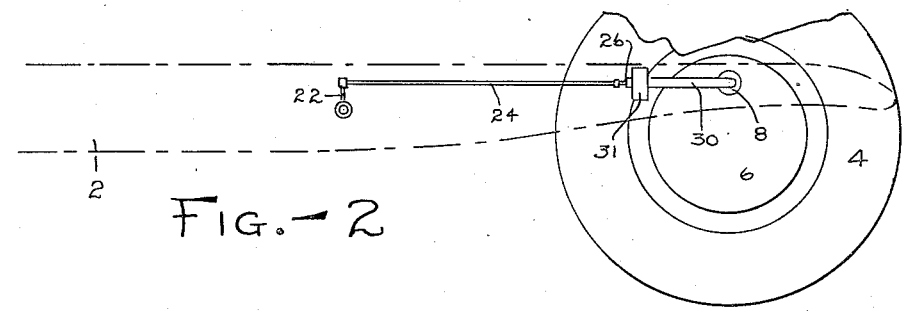
Figure 3:

In the drawings, Fig. 1 is a top plan view of the chassis of a motor vehicle showing principally the swiveling wheels and brake operating mechanism for those wheels; Fig. 2 illustrates the left side rail of the vehicle frame with the control mechanism; Fig. 3 shows the right side rail with the control mechanism; Fig. 4 is a diagrammatic illustration of the linkage involving an equalizing arrangement between front and rear brakes; Fig. 5 is a top plan view of a chassis showing connections with the swiveling wheels, other than conduits; Fig. 6 is taken along the lines 6—6 of Fig. 5; Fig. 7 shows an elevation of the right side rail of the chassis frame of Fig. 5 with a brake control associated therewith.

Referring to the drawings, in Fig. 1 there is illustrated a vehicle frame F having a right side rail 1 and a left side rail 2. A front axle 3 supports the forward portion of the frame in the usual manner and has wheels 4 and 5 swivelingly mounted at its ends. Swiveling with the wheels are brakes 6 and 7 respectively, which as in the usual practice each carry a fixed part swiveling with the wheel, which parts carry brackets 8 and 9 respectively.

Suitably journalled in or upon the side frame members is shown a transverse brake shaft 20, see also Fig. 4, adapted to be rocked by suitable means such as a brake pedal 21. The ends of the shaft may carry conventional arms 22 and 23, see Figs. 2, 3 and 4, to which are connected brake pull rods 24 and 25 respectively.

In Figs. 1 and 4, there is shown a "hook-up" which provides equalization between the effort delivered to the front and rear brakes. It will suffice for the moment to consider the action of the front wheel brakes.

Depression of the pedal 21 serves to draw rearwardly the pull rods 24 and 25 for the purpose of actuating the front wheel brakes. The forward end of the pull rod 24 is directly connected to a wire or cable 26, which cable in turn extends to the brake 6 and by suitable connections, not shown, serves to actuate the brake when the rod and cable are drawn by depression of the pedal 21.

To guide the cable 26 between the side frame member 2 and the brake 6, a flexible conduit 30 is provided, which is secured to the side frame member by such means as a bracket 31. The conduit is secured at its other end in the bracket 8 which, as mentioned above, is secured to the fixed swiveling part of the brake. If Bowden conduits are used, it will appear to those skilled in the art, that when the vehicle is turned to the left that the conduit 30 will creep upon the cable and tend to expand the brake to a greater extent than when the vehicle is moving straight ahead, for a given depression of the pedal 21. If a like connection were used for the right front wheel 5, unequal braking effects would result when the wheels are turned by reason of one conduit tending to shrink upon its cable and the other conduit tending to creep upon its cable. Thus the conduit 40 is secured at one end to the bracket 9 which swivels with the wheel and is secured at its other end to the vehicle frame through bracket 41 which is disposed forward of the front axle as contrasted to the bracket 31 which is disposed to the rear of the vehicle axle. The brackets 31 and 41 are preferably disposed like distances fore and aft of the plane of the front axle and the swiveling axes of the wheels, and preferably extend like distances away from that plane normal thereto or at least at like angles thereto. If the plane of the swiveling axes is not vertical, the elevation of the brackets 31 and 41 may be different to compensate for the deviation of the plane from the vertical. The conduit 40 therefore, lies in a position complementary to the conduit 30 and regardless of the pitch of the king pins or the inclination of the axle, the conduits 30 and 40 will assume equal shapes when the wheels are turning either to the right or left.

Referring also to Fig. 3, the pull rod 25 extends forwardly beyond the axle and is pivotally connected to a lever 50 at 51. The lever is pivotally mounted in its middle on the side frame as at 52 and has a pivotal connection at 53 with a wire or cable 27, which passes through the conduit 40, and is connected to suitable operating mechanism in the brake 7. Thus a given rearward movement of the brake rod 25 draws the cable 27 the same amount as like movement of the rod 24 draws the cable 26.

When the swiveling wheels 4 and 5 are turned to the left, both of the conduits 30 and 40 may creep upon the cables or wires 26 and 27 like amounts so that a given rotation of the shaft 20 will cause equal motions of the brake actuating mechanisms in the brakes 6 and 7. When the wheels are turned to the right the conduits 30 and 40 may shrink on the cables like amounts with equal braking results.

Referring also to Fig. 4, it will be seen that for equal braking effects of the front wheels in left and right turns, that the shaft may have to be rotated unlike amounts to prevent the front wheels from taking either more or less than their portion of the load from the rear wheels. A conventional equalization linkage is provided between the front and rear brakes so that a predetermined proportion of load distribution may be maintained between the front and rear brakes regardless of the turning of the front wheels.

Referring particularly to Figs. 5, 6 and 7, I show a modified form of my invention as applied to a well known commercial product which does not involve the use of flexible conduits and cables. Like numerals referring to like parts in all figures, I illustrate the brake rod 25 (see Figs. 5 and 7) extending beyond the front axle and operating through the lever 50 in the manner described above, and I show the rod 24 terminating at or behind the front axle and engaging a lever 60 which is pivoted on the axle at 61 and adapted to swing generally in a horizontal plane. The outward end of the lever 60 engages an arm 62 as at 63, see also Fig. 6. The arm 62 may be fixed to a cam shaft or other brake actuating mechanism so that when the lever 60 is moved, the brakes are applied. Referring particularly to Fig. 6, I designate by broken line L the swiveling axis of the wheel and it will be appreciated that when the wheel swivels during the application of the brakes, that the point of contact 63 changes its position with relation to the swiveling axis. It will further be appreciated that if the lever 60 and arm 62 were arranged in the same manner on opposite sides of the vehicle, that the change of the point of contact between these levers would give unlike effects on the right and left brakes.

To compensate for this, I arrange the lever 70 on the right side of the vehicle in a position complementary to the lever 60 and connect the lever 70 to the linkage through the rod 25, lever 50 and link 75. Thus when the rods 24 and 25 are drawn rearwardly to apply the brakes, the inner end of the lever 60 is drawn rearwardly but the inner end of the lever 70 is drawn forwardly so that a complementary relationship is maintained between the levers 60 and 70 relative to the vehicle axle and to the swiveling axis of the wheels. Thus the right and left front brakes take equal loads without regard to the swiveling of the wheels in a manner similar to that described above where flexible conduits and cables are used between the linkage and the swiveling brakes.

From the foregoing it appears that by the connections illustrated and described, I have provided an arrangement and disposition of parts in a manner which insures equal braking effects through the right and left steering wheels without regard to their turning. Modifications and changes may occur to those skilled in the art without departing from the spirit of my invention and I do not care to be limited in the scope of my patent other than by the claims appended hereto.

I claim:

1. Operating mechanism for brakes on swiveling wheels including controls for the brakes, said controls being disposed in like relation to each wheel and in complementary relation to each other and on opposite sides of the plane of the swiveling axes of the wheels whereby the controls assume like angular relations to the wheels regardless of their turning.

2. Operating mechanism for brakes on swiveling wheels including pull rods for each wheel and controls extending between the pull rods and the brakes carried by the wheels, said controls being disposed on opposite sides of the axle which carries the wheels.

3. In a vehicle having a front axle with swiveling wheels, brakes associated with said wheels and swiveling therewith, mechanism for operating said brakes including a control for one wheel disposed generally behind the front axle and a similar control for the other wheel disposed generally in front of the front axle.

4. In a vehicle having swiveling wheels, brakes associated with said wheels and swiveling therewith, mechanism for operating said brakes including a control for one wheel disposed generally behind a vertical plane normal to the center of the wheel, and a similar control for the other wheel disposed generally in front of a similar plane relative to the other wheel.

5. In a vehicle having a frame and swiveling front wheels with brakes swiveling with the wheels, the combination of connections for one of said brakes disposed behind the plane of the swiveling axes of the wheels on one side of the vehicle, connections for the other of said brakes disposed in front of said plane on the other side of the vehicle, and a lever associated with said last named connections pivotally mounted on the frame in front of said plane.

6. In a vehicle having a frame and swiveling front wheels with brakes swiveling with the wheels, the combination of mechanism for operating said brakes including pull rods, connections between said pull rods and said brakes disposed behind the plane of the swiveling axes of the wheels on one side of the vehicle and disposed in front of said plane on the other side of the vehicle, and a lever associated with said last named connections connected to one of said pull rods and pivotally mounted on the frame.

7. In a vehicle having brakes on four wheels of which the front pair of wheels are adapted to swivel, mechanism for operating said brakes including means for equalizing the effort delivered to the front and rear sets of brakes and connections between said mechanism and said front brakes arranged on opposite sides of the plane of the swiveling axes of the front wheels.

8. In a vehicle having brakes on four wheels of which the front pair of wheels are swiveling, mechanism for operating said brakes including means for equalizing the effort delivered to the front and rear sets of brakes and connections between said mechanism and said front wheel brakes arranged in like relation to each wheel and in complementary relation to each other and each adapted to maintain like angular positions relative to each wheel during the swiveling of said wheels.

9. Mechanism according to claim 8 wherein the operating connections for the front wheel brakes include a flexible conduit for each wheel wherein one of the conduits extends rearwardly from the middle of its wheel and the other extends forwardly from the middle of its wheel.

10. Operating mechanism for the brakes of the swiveling wheels of a vehicle including parts for actuating one of said brakes which transmits more motion to the brake when the wheel is swiveled in one direction than when the wheel is swiveled in the other direction, and parts associated with the brake on the other wheel in a complementary manner so that equal forces are applied to both wheels as they swivel, albeit both wheels may receive greater braking effort for a given movement imparted to said parts when swiveled in one direction than in another.

11. Mechanism according to claim 10 including rear wheel brake operating mechanism, and an equalizing device between the front and rear wheel brake operating mechanisms, whereby predetermined proportions of braking efforts may be maintained between all of the wheels of the vehicle regardless of the swiveling of the front wheels.

12. A vehicle having a front axle, a frame, swiveling wheels carried at opposite ends of the axle, brakes for each of said wheels, operating mechanism for one of said brakes including a flexible conduit with a cable housed therein associated at one end with one of said brakes and secured at its other end to the side rail of the frame of the vehicle at a point behind the axle, and a similar control for the other brake including a flexible conduit secured to the side rail of the frame of the vehicle at a point in front of the axle and a cable extending through said last named conduit and connected to said brake and having an end extending beyond the conduit adjacent said side rail.

13. A vehicle having a front axle, a frame, swiveling wheels carried at opposite ends of the axle, brakes for each of said wheels, operating mechanism for said brakes including a flexible conduit with a cable housed therein associated at one end with one of said brakes and secured at its other end to the side rail of the frame of the vehicle at a point behind the axle, a similar control for the other wheel including a flexible conduit secured to the side rail of the frame of the vehicle at a point in front of the axle and a cable extending through said conduit and connected to said brake and having an end extending beyond the conduit adjacent said side rail, and a lever pivoted on said side rail having one end connected to said cable and means for rocking said lever and pulling the cable.

14. In a vehicle having a frame, a front axle, wheels mounted to swivel on the ends of said axle, brakes swiveling with said wheels, operating mechanism for said brakes including parts carried by the frame and connections between said parts and said swiveling brakes including flexible conduits lying in planes disposed at like angles to the plane of the swiveling axes of the wheels and having portions lying in planes substantially at right angles to said plane of the swiveling axes on opposite sides thereof.

15. In a vehicle having a frame, a front axle, wheels mounted to swivel on the ends of said axle, brakes swiveling with said wheels, operating mechanism for said brakes including parts carried by the frame and connections between said parts and said swiveling brakes including flexible conduits lying in a plane normal to the plane of the swiveling axes of the wheel and having portions extending substantially normal to said plane on opposite sides thereof.

16. Operating mechanism for brakes carried by swiveling wheels disposed at the ends of an axle of a vehicle, including pull rods extending longitudinally of the vehicle, one of said pull rods terminating short of the axle and the other of said pull rods extending beyond the axle, a lever pivotally mounted beyond the axle having one end connected to the last named pull rod and connections disposed in complementary relation to the axle, one of which is connected directly to the first named pull rod and the other of which is connected to the other end of said lever.

17. Operating mechanism for brakes carried by swiveling wheels disposed at the ends of the front axle of a vehicle, including a pair of pull rods extending longitudinally of the vehicle on either side thereof, one of said pull rods terminating adjacent the front axle and the other of said pull rods extending beyond and in front of the front axle, a lever pivotally mounted in front of the front axle having one end connected to the last named pull rod, and connections comprising flexible conduits with cables housed therein and disposed in complementary relation with the front axle, one of which is connected directly to the first named pull rod and the other of which is connected to the other end of the said lever.

18. Operating mechanism for brakes on swiveling wheels including controls for the brakes, said controls offering varying amounts of frictional resistance to the application of the brakes depending on the swiveled position of the wheels, said controls being oppositely positioned on opposite wheels and offering similar amounts of frictional resistance regardless of the position of the wheels.

19. Operating mechanism for brakes on swiveling wheels comprising flexible conduits with cables therein which conduits tend to creep or shrink on the cables depending on their positions of curvature, said conduits being oppositely disposed on opposite sides of the vehicle whereby they assume like positions of curvature as the wheels swivel and whereby they creep or shrink like amounts on their respective cables as the wheels swivel.

20. Operating mechanism for vehicle brakes on swiveling wheels carried at opposite ends of an axle including pull rods for actuating said brakes extending generally fore and aft of the vehicle, one of said pull rods terminating short of the axle and the other pull rod extending beyond the axle, and connections between the ends of the pull rods and the brakes extending respectively forward for one brake and rearward for the other brake.

In testimony whereof, I hereunto affix my signature.

FREDERIC M. BOSWORTH.